US012050182B2

(12) United States Patent
Hemler et al.

(10) Patent No.: US 12,050,182 B2
(45) Date of Patent: Jul. 30, 2024

(54) SYSTEM AND METHOD FOR ASSESSING WEAR ON THE TREAD OF A SHOE FOR LIMITING SLIP AND FALL RISK

(71) Applicant: UNIVERSITY OF PITTSBURGH—OF THE COMMONWEALTH SYSTEM OF HIGHER EDUCATION, Pittsburgh, PA (US)

(72) Inventors: Sarah L. Hemler, Geneva (CH); Kurt E. Beschorner, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 74 days.

(21) Appl. No.: 18/061,215

(22) Filed: Dec. 2, 2022

(65) Prior Publication Data
US 2023/0228689 A1    Jul. 20, 2023

Related U.S. Application Data

(60) Provisional application No. 63/266,920, filed on Jan. 19, 2022.

(51) Int. Cl.
G02B 6/42    (2006.01)
G01N 21/88   (2006.01)
(Continued)

(52) U.S. Cl.
CPC .......... *G01N 21/8851* (2013.01); *G02B 6/42* (2013.01); *G06T 7/0002* (2013.01); *G06T 7/62* (2017.01);
(Continued)

(58) Field of Classification Search
None
See application file for complete search history.

(56) References Cited

U.S. PATENT DOCUMENTS 9,285,303 B2    3/2016 Schleipen et al.
10,650,228 B2   5/2020 Roberson et al.
(Continued)

OTHER PUBLICATIONS

Needham, J. A., & Sharp, J. S. (2016). Watch your step! A frustrated total internal reflection 453 approach to forensic footwear imaging. Scientific reports, 6, 21290.
(Continued)

*Primary Examiner* — Eileen M Adams
(74) *Attorney, Agent, or Firm* — Philip E. Levy; Eckert Seamans Cherin & Mellott, LLC

(57) ABSTRACT

A system for monitoring the tread of a shoe includes a frame member, a waveguide structured to support the shoe when an outer sole of shoe is in contact with a surface of the waveguide, a light source structured to provide light within an edge of the waveguide such that the light will be internally reflected within the waveguide, and an imaging device structured and configured to generate an image of the outer sole of the shoe when the outer sole of shoe is in contact with the waveguide and the light is being provided within the waveguide. The system also includes a controller structured and configured to: (i) receive image data based on the image of the outer sole; (ii) determine from the image data a largest worn region size for the shoe; and (iii) determine a slip risk for the shoe based on the largest worn region size.

22 Claims, 2 Drawing Sheets

(51) Int. Cl.
*G06T 7/00* (2017.01)
*G06T 7/62* (2017.01)
*H04N 23/56* (2023.01)

(52) U.S. Cl.
CPC ..... *H04N 23/56* (2023.01); *G01N 2021/8874* (2013.01)

(56) References Cited

U.S. PATENT DOCUMENTS

| | | | |
|---|---|---|---|
| 2005/0217142 A1* | 10/2005 | Ellis, III | A43B 13/38 36/25 R |
| 2019/0196002 A1* | 6/2019 | Manneschi | A43D 1/025 |
| 2020/0146397 A1 | 5/2020 | Coupe et al. | |
| 2022/0061463 A1* | 3/2022 | Vanderoef | B29D 35/122 |

OTHER PUBLICATIONS (Bharthi, R., Hemler, S. L., & Beschorner, K. E. (2021). Correlation Between Wear Region of Shoes and Contact Region During Early Gait. Paper presented at the International Society of Biomechanics, Virtual, p. 626). (Only the First Page is Attached Due to Size—see https://media.isbweb.org/images/conferences/isb-congresses/2021/programabstractbook/isb2021_programabstracts.pdf).

* cited by examiner

SYSTEM AND METHOD FOR ASSESSING WEAR ON THE TREAD OF A SHOE FOR LIMITING SLIP AND FALL RISK

CROSS REFERENCE TO RELATED APPLICATIONS

This application claims priority to U.S. Provisional Patent Application Ser. No. 63/266,920, filed on Jan. 19, 2022 and titled "SYSTEM AND METHOD FOR ASSESSING WEAR ON THE TREAD OF A SHOE FOR LIMITING SLIP AND FALL RISK." the disclosure of which is incorporated herein by reference.

STATEMENT OF GOVERNMENT INTEREST

This invention was made with government support under grant #1747452 awarded by the National Science Foundation (NSF). The government has certain rights in the invention.

FIELD OF THE INVENTION

The present invention pertains to slip and fall prevention, and in particular, to a system and method for automatically assessing the degree of wear of the tread on a shoe in order to alert a wearer of the need to repair or replace the shoe to limit slip and fall risk.

BACKGROUND OF THE INVENTION

Slips and falls are often caused by insufficient friction between the shoe and the floor, often in the presence of a contaminant such as water, oil or some other debris. Shoe tread is an important part of reducing slip risk, as the fluid can be drained from under the shoe to prevent fluid pressurization. However, as shoe tread becomes worn, slip risk increases.

Slip and fall prevention is particularly important in the workplace, such as, without limitation, in the food service industry. Currently, there are no tools which efficiently and simply determine when shoes should be replaced.

SUMMARY OF THE INVENTION

In one embodiment, the disclosed concept provides a system for monitoring the tread of a shoe to mitigate slip and fall risk. The system includes a frame member, a waveguide coupled to the frame member, wherein the waveguide and the frame member are structured to support the shoe when an outer sole of shoe is in contact with a surface of the waveguide, a light source structured to provide light within an edge of the waveguide such that the light will be internally reflected within the waveguide, and an imaging device structured and configured to generate an image of the outer sole of the shoe when the outer sole of shoe is in contact with the surface of the waveguide and the light is being provided within the waveguide. The system also includes a controller structured and configured to: (i) receive image data based on the image of the outer sole of the shoe; (ii) determine from the image data, a largest worn region size for the shoe; and (iii) determine a slip risk for the shoe based on the largest worn region size.

In one embodiment, the disclosed concept provides a method for monitoring the tread of a shoe to mitigate slip and fall risk that includes steps of providing light within an edge of a waveguide such that the light will be internally reflected within the waveguide, generating an image of an outer sole of the shoe when the outer sole of shoe is in contact with a surface of the waveguide and the light is being provided within the waveguide, receiving image data based on the image of the outer sole of the shoe, determining from the image data a largest worn region size for the shoe, and determining a slip risk for the shoe based on the largest worn region size.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
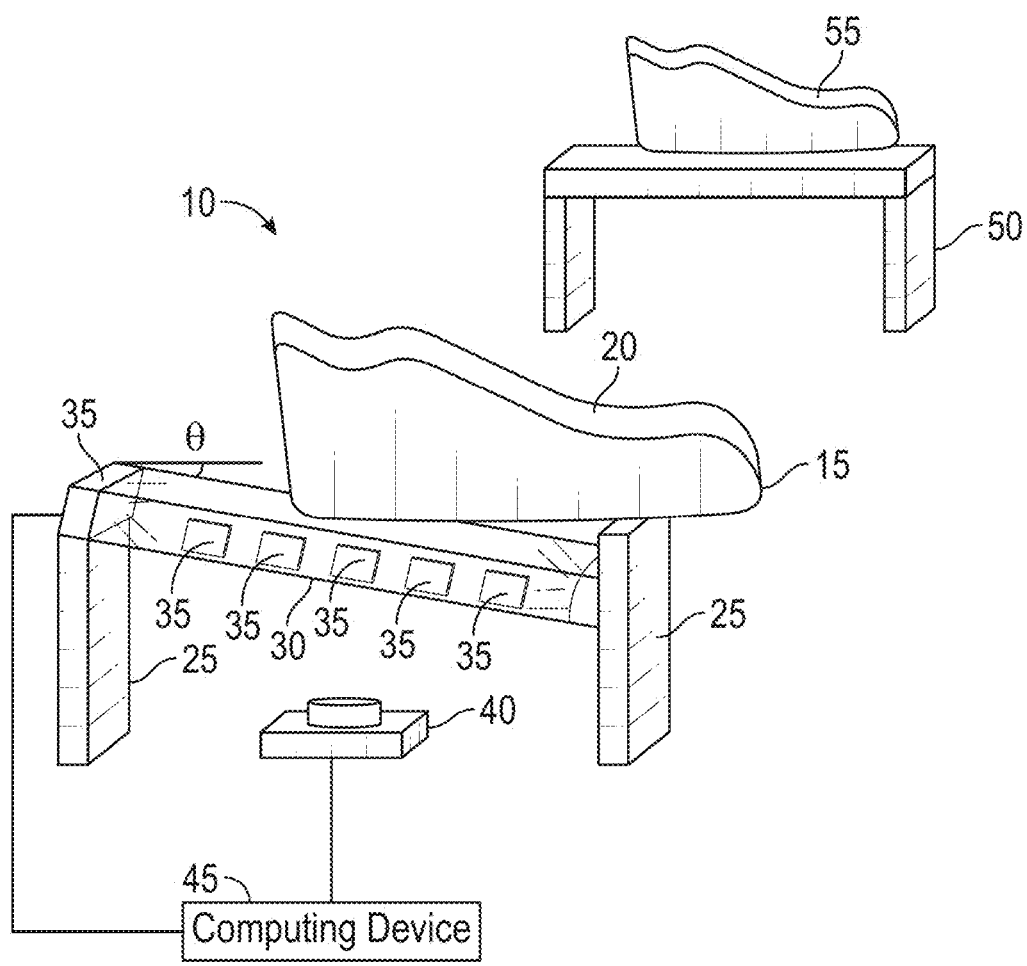
FIG. 1 is a schematic diagram of a system for monitoring the tread of a shoe to mitigate slip and fall risk according to one non-limiting, exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term "largest worn region size (WRS)" of a shoe tread shall mean the largest region of the tread of a shoe that is in direct continuous contact with the waveguide of the disclosed concept. Quantitatively, in the exemplary embodiment, the largest WRS is determined using a digital image of the tread and is defined as the largest region of the tread that has a continuous spread of pixels in continuous contact with the waveguide as determined by processing the image of the tread. Particular methods for determining tread continuity and largest WRS are discussed in detail herein and in Appendix A.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

Frustrated Total Internal Reflection (FTIR) technology has been used by scientists for centuries dating back to Newton and Fresnel in the 18th century. Over the last several decades, the technology has been used for a variety of imaging applications ranging from measuring multi-touch sensing to capturing fingerprint scans (Harrick, N. J., "Use of Frustrated Total Internal Reflection to Measure Film Thickness and Surface Reliefs", Journal of applied physics, 33(9), 2774-2775 (1962) and Han, J. Y., "Low-cost multi-touch sensing through frustrated total internal reflection", Proceedings of the 18th annual ACM symposium on User interface software and technology (2005)). FTIR has also been used to study foot contact area in clinical settings and to analyze prints from footwear for forensics analysis (Betts, et al., "Static and dynamic foot-pressure measurements in clinical orthopaedics", Medical and biological Engineering and Computing, 18(5), 674 (1980) and Needham, J. A., & Sharp, J. S., "Watch your step! A frustrated total internal reflection approach to forensic footwear imaging", Scientific reports, 6, 21290 (2016)).

FTIR describes the process of shining light into a transparent plate (i.e., a waveguide) at an incident angle larger than the critical angle, which ensures that the light is internally reflected when contacted by air. The boundary condition changes when materials with a larger refractive index than air, such as shoe outsoles or skin, encounter the waveguide. The change enables light to be transmitted out of the waveguide and into the contacting structure, such as a shoe outsole or skin, and scattered. The scattered light illuminates the contact region which can then be detected by an imaging device like a digital camera.

As described herein and in Appendix A attached hereto, the disclosed concept provides a method and tool for detecting the largest WRS of the tread on a shoe in order to identify an increase in slip risk due to worn shoes. In the exemplary embodiment, the tool uses FTIR to assess the degree of shoe tread wear. In particular, light is shone into a waveguide in which the light is internally reflected. The shoe outsole of the shoe being assessed is placed into contact with the waveguide, and, as a result, light is reflected out of the waveguide. This external reflection is detected via an imaging device to create a raw image of tread of the shoe. That image is provided to a controller, which includes an algorithm, described in detail herein and in Appendix A, for analyzing the image data to determine the size of the largest WRS of the tread that is in contact with the waveguide. The algorithm is also configured to determine the likelihood of a slip based on the largest WRS data. In one particular implementation, the determination of slip risk involves determining and providing a binary outcome in the form of "slip risk detected" or "no slip risk detected." It will be understood, however, that this is meant to be exemplary and that other types and forms of slip risk determinations and outcomes/outputs may also be employed within the scope of the disclosed concept.

In the exemplary embodiment, to operate the tool, the individual stands on the waveguide with one shoe and on a supplementary supporting surface with the other shoe. The shoe on the waveguide is scanned and the largest WRS is detected. The tool's algorithm then determines the slip risk based on the detected WRS. In an alternative embodiment, the disclosed may also be used with two FTIR devices that measure both shoes simultaneously.

Therefore, the disclosed concept offers an inexpensive, quick method for determining the slip risk for a particular pair of shoes to guide shoe replacement, and thus reduce slip risk. In the exemplary embodiment, the tool of the disclosed concept is implemented and contained within a small frame system that enables it to be portable.

In the exemplary embodiment, as just described, the disclosed concept assesses slip risk by measuring the size of a continuous region of tread contact between a shoe outsole and a walking surface. The disclosed concept may use multiple wavelengths of light to enable more robust function across different colors of shoe tread (based on color of the tread being scanned). Specifically, the present inventors have determined that using different wavelengths (e.g., red, green and blue) may be useful for determining the exact region of contact between the waveguide and different colors of tread on the shoe.

The disclosed concept may also offer adjustable angles of the waveguide to enable adjustments so that it is relevant to measure optimal heel worn region contact across different types of gait tasks. Specifically, during the stance phase of gait, shoes contact the ground at a range of angles. The angles at which the waveguide may operate describe angles most associated with slip onset and peak slipping speed. For this analysis, 7 and 17 degrees were chosen for the angles of imaging. These angles chosen also were able to capture the largest regions of wear on the heel of the shoe from generally looking at wear locations on the shoes from the human slip experiment described elsewhere herein. The exemplary 7-17 degree range is meant to be exemplary only, and it will be understood that the range of angles can be larger or smaller depending on the circumstances.

FIG. 1 is a schematic diagram of a system 10 for monitoring the tread 15 of a shoe 20 to mitigate slip and fall risk according to one non-limiting, exemplary embodiment of the disclosed concept. The system 10 includes a frame assembly 25 having a waveguide 30 coupled thereto as shown in FIG. 1. In the illustrated embodiment, frame assembly 25 is structured such that the angle $\theta$ of the top surface of waveguide 30 is selectively adjustable by moving/pivoting the waveguide relative to the legs of frame assembly 25. As described herein, the ability to selectively adjust the angle helps to optimize the imaging and data collection processes that are necessary to properly analyze different types of shoes 20.

Together, frame assembly 25 and waveguide 30 are structured to support an individual wearing shoe 20 while standing on frame assembly 25 and waveguide 30 as shown. In the illustrated exemplary embodiment, system 10 further includes a separate support assembly 50 that is structured to support the other foot of the individual wearing a second shoe 55 during operation of the tool. Thus, during operation, in this exemplary embodiment, a user is able to stand on both frame assembly 25 and support assembly 50 while system 10 makes the measurements and assessments relating to slip and fall risk that are described herein.

As noted elsewhere herein, the disclosed concept employs FTIR to assess the degree of shoe tread wear based on a determined largest WRS of tread 15 of shoe 20. Thus, as seen in FIG. 1, system 10 further includes a light source 35 that is coupled to waveguide 30. Light source 35 is structured to selectively generate (under the control of computing device 45 described below) and provide light of one or more wavelengths/colors within an edge of waveguide 30 such that the light will be internally reflected within waveguide 30.

When only air is touching waveguide 30 (which has a relatively low refractive index), the light provided to waveguide 30 continues to only be internally reflected within waveguide 30 and does not reflect externally. However, when shoe 20, which has a larger refractive index than air, contacts waveguide 30, the light is transmitted out of the waveguide. As seen in FIG. 1, system 10 further includes an imaging device 40, such as a digital camera, that is positioned below the bottom surface of waveguide 30 in order to capture an image of the tread 15 of shoe 20 when it is in contact with the top surface of waveguide 30 (thereby, as just described, causing light to be transmitted out of waveguide 30). In addition, system 10 includes a computing device 45 that is operatively coupled to imaging device 40, frame assembly 25 and light source 35. Accordingly, and as described in greater detail herein, the image of tread 15 of shoe 20 that is captured by imaging device 40 is provided to computing device 45, wherein it is processed in order to determine from the image data (i) the largest WRS for shoe 20, and (ii) based on the determined largest WRS, the slip risk for shoe 20.

In the exemplary embodiment, waveguide 30 comprises a transparent sheet made of a material such as glass or acrylic through which light can be shown and internally reflected. As will be appreciated, waveguide 30 needs to be thick enough to allow light source 35 to shine light within one or more edges of waveguide 30. In one particular exemplary embodiment, a light blocking mechanism, such as black tape, is provided on certain edges of waveguide 30 to ensure that imaging device 40 only identifies light internally reflected and does not pick up ambient light directly from light source 35.

In addition, in the illustrated exemplary embodiment, light source 35 includes strip lighting that is applied directly to a small edge of waveguide 30 such that the light generated by light source 35 and provided to waveguide 30 will be internally reflected within waveguide 30. It will be appreciated, however, that this is meant to be exemplary only and that other types and forms of light source 35 are contemplated within the scope of the disclosed concept.

Figure 2:
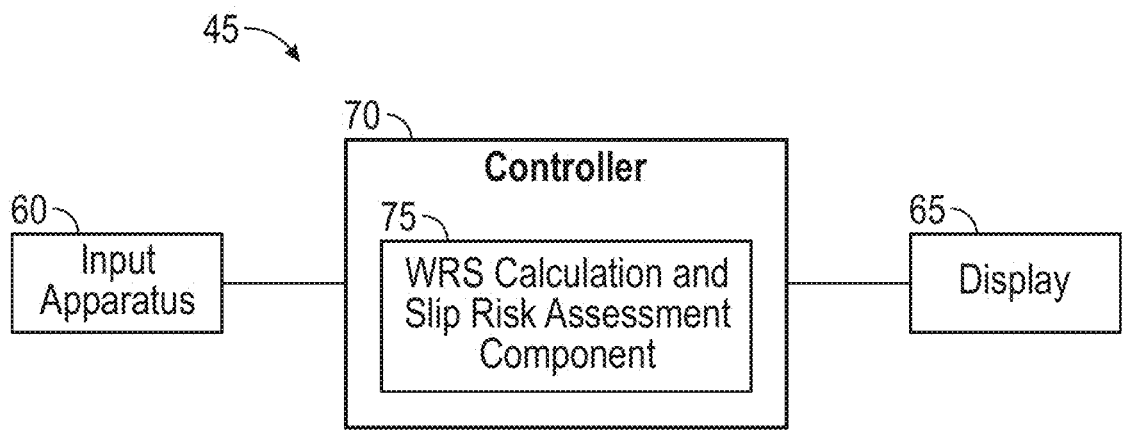
FIG. 2 is a schematic diagram of the computing device forming part of the system of FIG. 1 according to an exemplary embodiment of the disclosed concept.

FIG. 2 is a schematic diagram of computing device 45 according to an exemplary embodiment of the disclosed concept as described herein. The exemplary computing device 45 is, for illustrative purposes, a PC, although it will be appreciated that computing device 45 may be another type of electronic device, such as, without limitation, a tablet computer, a laptop computer or a smartphone, without departing from the scope of the disclosed concept. As seen in FIG. 2, computing device 45 includes an input apparatus 60, which may include a plurality of buttons and/or a touchscreen, a display 65, and a controller 70. A user (e.g., the wearer of shoe 20) is able to provide input into controller 70 using input apparatus 60, and controller 70 provides output signals to display 65 to enable display 65 to display information to the user, such as the result of the slip risk assessment that is performed based on the analysis of tread 15 of shoe 20 as described herein.

As described elsewhere herein, controller 70 includes a processor portion and a memory portion. The memory portion has stored therein a number of routines that are executable by the processor portion. According to an aspect of the disclosed concept, controller 70 includes one or more routines that implement (by way of computer executable instructions) a WRS calculation and slip risk assessment component 75 that is configured to, among other things, (i) receive image data based on the image of the tread/outer sole 15 of shoe 20 that is captured by imaging device 40, (ii) determine from the image data the largest WRS for shoe 20, and (iii) determine a degree of slip risk for the shoe based on the WRS according to one or more of the various embodiments described in detail herein.

Figure 3:
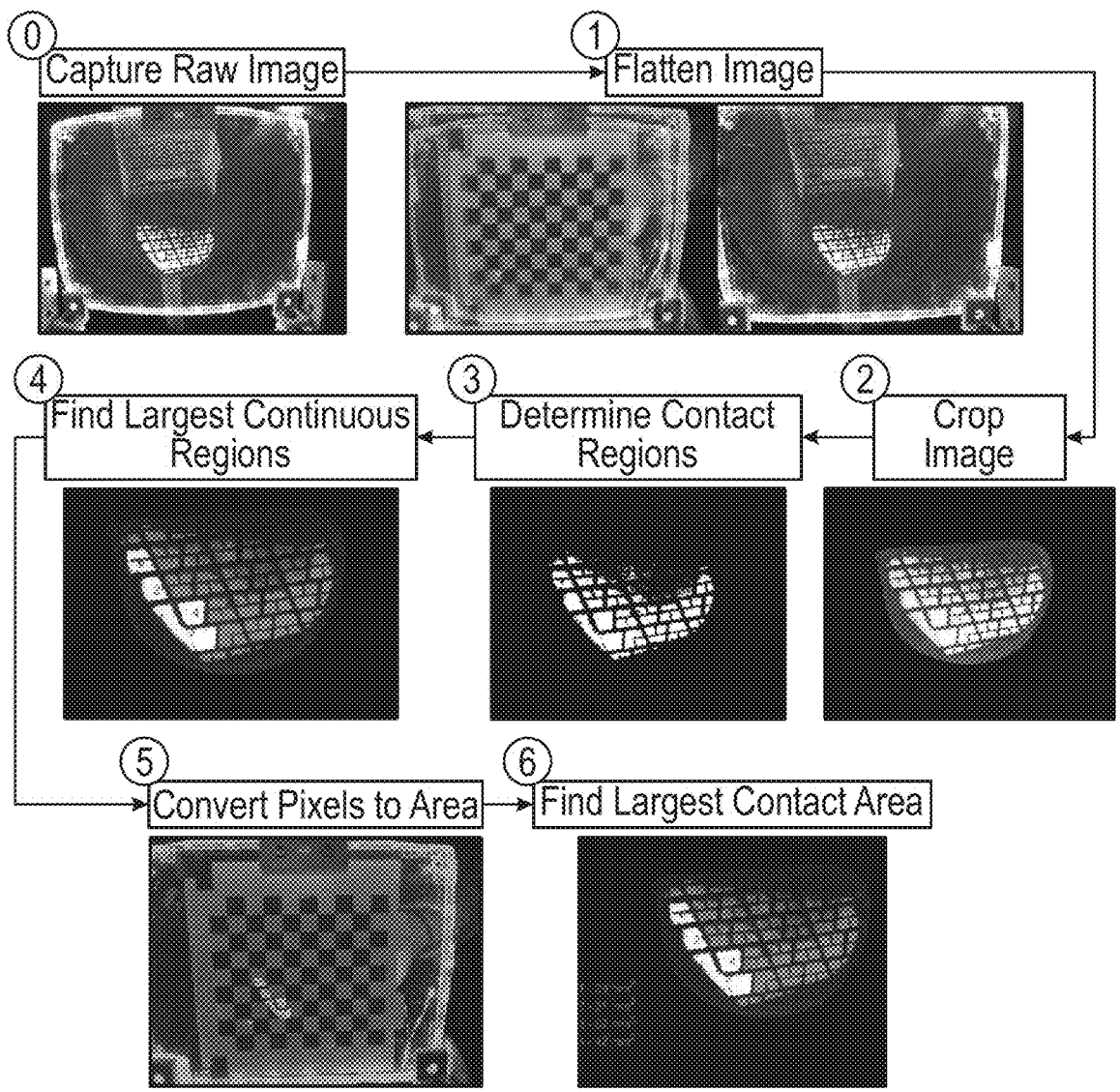
FIG. 3 is a schematic diagram illustrating a method of determining the largest WRS for a shoe by processing the image data representing the image that is captured by the imaging device of the system of FIG. 1 according to an exemplary embodiment of the disclosed concept.

FIG. 3 is a schematic diagram illustrating a method of determining the largest WRS for shoe 20 by processing the image data representing the image that is captured by imaging device 40. Specifically, FIG. 3 illustrates a method comprising a series of steps numbered 0-6, each of which is described in detail below. It will be understood, however, that the method illustrated in FIG. 3 and described herein is meant to be exemplary only, and that other methods of determining the largest WRS are also contemplated within the scope of the disclosed concept.

As shown in step 0, the method begins with imaging device 40 capturing a raw image of tread 15 of shoe 20 while light source 35 provides light to waveguide 30 as described herein. Next, as shown in step 1, a calibration function is used to flatten the wide-angle image captured by imaging device 40 using a checkerboard, which in the non-limiting, exemplary embodiment includes 9×10 blocks, each with 11.4 mm lengths. Then, in step 2, a cropping function is used to allow the user to select the portion of the image that contains the part of tread 15 that is in contact with waveguide 30. At step 3, a number of contact regions (i.e., regions in contact with waveguide 30) for tread 15 are determined. Specifically, in the exemplary embodiment, step 3 is performed by selecting two of the brightest and dullest features of the contact regions. Within those four points, the minimum and maximum hue value(s) and saturation value(s) are measured to create a range of acceptable contact pixels. In the exemplary embodiment, a buffer of, for example, 0.05 is added to the maximum value and subtracted from the minimum value to slightly increase the range which is used to determine the contact regions on the image. Then, at step 4, connected pixel components are identified so that a number of the largest continuous regions are identified and quantified. In step 5, the pixels determined in step 4 are converted to area, and in step 6, the largest contact area is determined from the calculated areas. The largest contact area determined in step 6 is the largest WRS.

Furthermore, in the exemplary embodiment, WRS calculation and slip risk assessment component 75 also includes an algorithm for determining the degree of slip risk associated with shoe 20 based on the largest WRS that is calculated for shoe 20. In the non-limiting exemplary embodiment, that algorithm comprises a regression model that is able to determine for any calculated largest WRS the degree of the slip risk. As noted elsewhere herein, in the exemplary embodiment, the degree of slip risk is determined in a binary fashion for shoe 20 such that one of two categories, i.e., no slip risk present or slip risk present, is determined.

In the exemplary embodiment, the regression model that is employed in WRS calculation and slip risk assessment component 75 was determined using a human slip risk experiment during which participants were unexpectedly exposed to a liquid contaminant on the floor. The slip outcome of slip or no slip was collected for each of the participant shoes. A logistic regression was then used to determine the association between the largest WRS and the slip outcome.

More specifically, according to one particular embodiment of the disclosed concept, the human slip risk experiment was conducted with fifty-seven participants while wearing their own naturally worn shoes. Participants were outfitted in tight-fitting clothing and a set of 79 reflective markers while they walked over dry ground. During the dry walking trials, participants walked over two force plates from which each participant's required coefficient of friction (RCOF) was calculated. After a series of dry walking trials, the participants unexpectedly walked over a contaminated surface (100 mL of a 90% glycerol-10% water by volume solution). The contaminant was applied on top of a 5×6 array of fluid pressure sensors which were embedded in the floor. The peak fluid pressure during the step was recorded as the maximum value across the 30 fluid pressure sensors. The anterior-posterior and medial-lateral positioning components of the inferior heel marker were used to calculate the slip speed using numerical differentiation. The peak slip speed (PSS) was calculated as the local maximum speed at least 50 ms after heel contact. A step was identified as a slip if the PSS exceeded 0.2 m/s. This classification was based on previous research that found a bimodal distribution for slips with low-severity slips of fully treaded shoes below this cutoff and high-severity slips with untreaded shoes above this cutoff. Therefore, a PSS exceeding 0.2 m/s was designated as the cutoff variable for a slip.

Thus, the disclosed concept provides an efficient, portable method and apparatus for automatically determining the slip risk presented by a pair of shoes to guide shoe replacement, and thus reduce slip risk.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for monitoring a tread of a shoe to mitigate slip and fall risk, comprising:
   a frame member;
   a waveguide coupled to the frame member, wherein the waveguide and the frame member are structured to support the shoe when an outer sole of shoe is in contact with a surface of the waveguide;
   a light source structured to provide light within an edge of the waveguide such that the light will be internally reflected within the waveguide;
   an imaging device structured and configured to generate an image of the outer sole of the shoe when the outer sole of shoe is in contact with the surface of the waveguide and the light is being provided within the waveguide; and
   a controller structured and configured to: (i) receive image data based on the image of the outer sole of the shoe; (ii) determine from the image data a largest worn region size for the shoe; and (iii) determine a slip risk for the shoe based on the largest worn region size.

2. The system according to claim 1, wherein the controller is structured and configured to determine the slip risk based on a regression model that associates largest worn region size with slip outcome based on certain truth data.

3. The system according to claim 1, wherein determining the slip risk comprises indicating a binary outcome of slip risk or no slip risk.

4. The system according to claim 1, wherein the waveguide comprises a sheet of glass or acrylic.

5. The system according to claim 1, wherein the light source is structured and configured to selectively generate the light with a plurality of different wavelengths comprising different colors under control of the controller.

6. The system according to claim 1, wherein an angle of the surface of the waveguide with respect to a plane of the frame member is selectively adjustable.

7. The system according to claim 6, wherein the angle is selectively adjustable between 7 degrees and 17 degrees.

8. The system according to claim 1, wherein the surface of the waveguide is a top surface of the waveguide, and wherein the imaging device is positioned beneath a lower surface of the waveguide opposite the top surface of the waveguide.

9. The system according to claim 1, further comprising a second frame member structured to support a second shoe of a wearer of the first shoe when the first shoe and the second shoe are being worn by the wearer.

10. The system according to claim 1, wherein the controller is structured and configured to determine from the image data the largest worn region size for the shoe by: (i) flattening the image data to create flattened image data, (ii) cropping the flattened image data to create cropped image data, (iii) determining a plurality of contact regions from the cropped image data, (iv) determining a number of largest continuous regions from among the plurality of contact regions, wherein each of the largest continuous regions comprises a plurality of connected pixels, and (v) determining an area of each of the largest continuous regions based on the pixels of the largest continuous regions, and (vi) determine a largest contact area as a largest one of the areas, wherein the largest contact area is the largest worn region size for the shoe.

11. The system according to claim 10, wherein the flattening the image data to create the flattened image data employs a calibration function that uses a checkerboard.

12. The system according to claim 1, wherein the light source comprises strip lighting provided along the edge of the waveguide.

13. A method for monitoring a tread of a shoe to mitigate slip and fall risk, comprising:
   providing light within an edge of a waveguide such that the light will be internally reflected within the waveguide;
   generating an image of an outer sole of the shoe when the outer sole of shoe is in contact with a surface of the waveguide and the light is being provided within the waveguide;
   receiving image data based on the image of the outer sole of the shoe;

determining from the image data a largest worn region size for the shoe; and determining a slip risk for the shoe based on the largest worn region size.

14. The method according to claim 13, wherein the slip risk is determined based on a regression model that associates largest worn region size with slip outcome based on certain truth data.

15. The method according to claim 13, wherein the determining the slip risk comprises indicating a binary outcome of slip risk or no slip risk.

16. The method according to claim 13, wherein the waveguide comprises a sheet of glass or acrylic.

17. The method according to claim 13, wherein the providing the light source comprises generating selectively generating the light from a predetermined plurality of different wavelengths comprising different colors.

18. The method according to claim 13, further comprising selectively adjusting an angle of the surface of the waveguide with respect to a plane of a frame member supporting the waveguide.

19. The method according to claim 18, wherein the angle is selectively adjustable between 7 degrees and 17 degrees.

20. The method according to claim 13, wherein the surface of the waveguide is a top surface of the waveguide, and wherein the image is generated from a position beneath a lower surface of the waveguide opposite the top surface of the waveguide.

21. The method according to claim 13, wherein the largest worn region size for the shoe is determined by: (i) flattening the image data to create flattened image data, (ii) cropping the flattened image data to create cropped image data, (iii) determining a plurality of contact regions from the cropped image data, (iv) determining a number of largest continuous regions from among the plurality of contact regions, wherein each of the largest continuous regions comprises a plurality of connected pixels, and (v) determining an area of each of the largest continuous regions based on the pixels of the largest continuous regions, and (vi) determine a largest contact area as a largest one of the areas, wherein the largest contact area is the largest worn region size for the shoe.

22. The method according to claim 21, wherein the flattening the image data to create the flattened image data employs a calibration function that uses a checkerboard.

\* \* \* \* \*